March 8, 1949.   J. HELSTROM   2,463,968
WINCH POWER UNIT
Filed Dec. 11, 1944
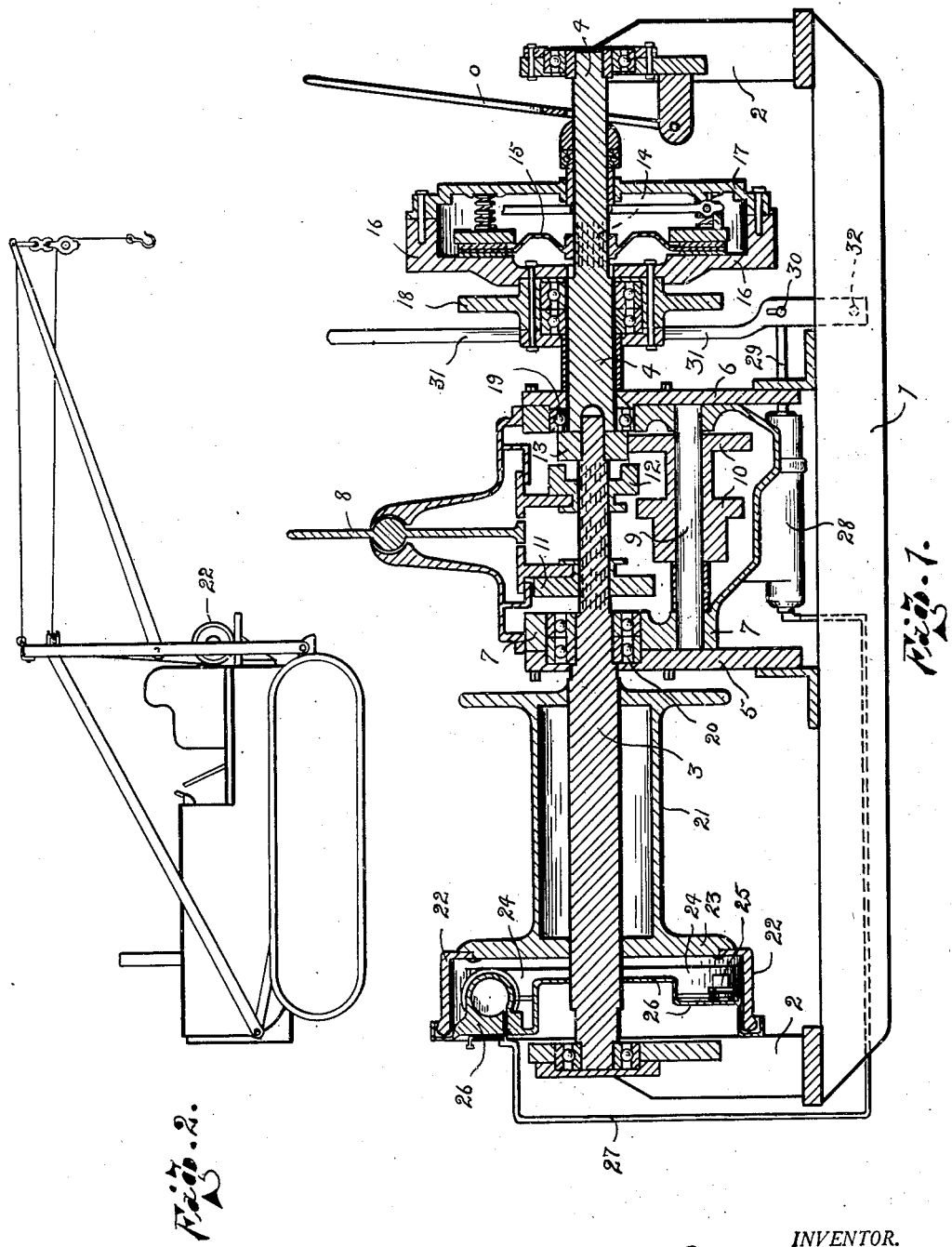
INVENTOR.
Julmer Helstrom.
BY Geo Stevens.
Atty.

Patented Mar. 8, 1949

2,463,968

UNITED STATES PATENT OFFICE 2,463,968

WINCH POWER UNIT

Julmer Helstrom, Cook, Minn.

Application December 11, 1944, Serial No. 567,627

2 Claims. (Cl. 254—166)

This invention relates to a winch transmission unit particularly adapted for use upon portable vehicles such as comparatively small tractors or the like engaged in logging or timber operations, this being the art in which those successively experimented with are found to be exceptionally practical. However, the same transmission assembly may be employed in other services where like manipulation of a winding drum may be advantageous.

Referring to the accompanying drawing forming a part of this application wherein like reference numerals indicate like parts;

Fig. 1 is a central vertical section longitudinally of the winch assembly, partly in section, and Fig. 2 is a much reduced outline elevation of the approximate appearance of the assembly as applied to a common caterpillar tractor equipped with a handling boom.

The specific assembly comprises a supporting base portion 1 of any convenient construction having at either end thereof upright supporting members or standards 2—2. Within the upper extremities of said standards is rotatably supported the major line of shafting consisting of two aligned shaft portions 3 and 4, the adjacent ends of which are telescopically united within a central box-like bearing comprising two spaced upright walls 5 and 6, also resting firmly upon the base 1, and forming suitable support for the housing of a common selective transmission assembly as used in automobile construction, the operating and shifting lever being illustrated at 8 and common to such forms of transmission. This particular transmission shown has means for four changes of speed and power regulation therein; however the specific construction of which forms no part of the present invention though a change of approximately four speeds is ample for the instant device as commonly used.

Within the lower portion 7 of the transmission housing and spaced below the main line of shafting, is the countershaft 9 carrying the necessary stepped gear 10 of the cluster gear assembly including the selectively shiftable gears 11 and 12 and also the gear 13, which latter gear is fixedly carried upon the innermost end of the main shaftline section 4 and which gear 13 is in constant mesh with the stepped gear 10.

The shaft section 4 of the main line shafting also has nonrotatably fixed thereon as by a suitable splined section 14, the friction clutch disc 15 which is housed within the common two-part separable housing sections 16 and 17, the former portion 16 of the housing carrying fixed thereto and about the shaft section 4, the power receiving sprocket 18, it having suitable ball or other bearings as illustrated for rotatable mounting of the shaft section 4 so that said sprocket may either rotate said shaft section 4 through the adjustable section of said clutch assembly or rotate freely upon said shaft 4 in response to the movement of the manual adjustment of the lever 0 controlling the operation of said clutch.

This entire clutch assembly, with the exception of its fixed association with the driving sprocket 18, is old in the automobile art, and the specific construction of which does not enter into the instant invention, as obviously some other form of clutch arrangement might answer every purpose as well.

A bearing for the innermost end of the shaft section 4 is illustrated at 19 and supported within the transmission housing 7; while a like bearing, preferably much more efficient, is shown at 20 for the innermost end of the larger shaft section 3 which has fixed thereto the winding drum 21.

A hollow extension indicated at 22 is attached as by welding or the like to the head end 23 of the drum 21 for housing of a common automobile hydraulic brake structure which is operated very much in the usual manner; that is, by the expansion and contraction of the uppermost end of the brake shoes 24 which are illustrated as being pivoted as at 25 upon the fixed portion 26 of the assembly. In this construction, I have illustrated and used in practice, a suitable pipe connection 27 extending to a master hydraulic cylinder 28 which is provided with the usual piston and rod therefor, the latter, rod 29, being pivotally connected as at 30 to the upstanding hand operated lever 31 which is pivoted as at 32 to a portion of base 1.

It may be here stated that simplicity and cheapness of construction being one of the major advantages of this assembly is derived by the fact that all three of the principal portions of the three selective units to wit: the clutch unit, the transmission unit, and the brake unit are of old well-known automobile parts and now readily obtainable in many auto-parts establishments, and consequently here deemed nonessential as to further detailed working parts.

However, the convenient arrangement of these three units with so few parts mounted upon a single line of two-part shafting furnishing the maximum of efficiency for the exceptional demands respecting speed, power, and sensitiveness of a winding drum in logging operations is deemed obvious.

Having thus described my invention, what I claim and desire to secure by Letters Patent is:

1. In a winch power transmission unit for ready application to a boom and tackle equipped self-propelled vehicle having power take-off means, a driving shaft, power receiving means carried by said shaft and connected with said take-off, a manually controlled clutch mechanism carried by said shaft and directly connected with said power receiving means for selective rotation of said shaft, a winding drum carrying shaft aligned with said driving shaft and cooperatively associated therewith, gear shifting and transmission means associated with and intermediate of said shafts, and independent manually controlled brake means for control of said winding drum.

2. In a winch power transmission unit for ready application to a boom and tackle equipped self-propelled vehicle having power take-off means, a driving shaft, power receiving means carried by said shaft and connected with said take-off, a manually controlled clutch mechanism carried by said shaft and directly connected with said power receiving means for selective rotation of said shaft, a winding drum carrying shaft aligned with said driving shaft and cooperatively associated therewith, gear shifting and transmission means associated with and intermediate of said shafts, and independent manually operated brake means for control of said winding drum, said unit being so constructed and arranged as to be conveniently controlled in respect to all of said adjustments from said vehicle.

JULMER HELSTROM.

REFERENCES CITED

The following references are of record in the file of this patent:

UNITED STATES PATENTS

| Number | Name | Date |
| --- | --- | --- |
| 262,048 | Jarboe | Aug. 1, 1882 |
| 906,841 | Whitcomb | Dec. 15, 1908 |
| 1,237,642 | Harwood | Aug. 21, 1917 |
| 1,378,734 | Steinberg | May 17, 1921 |
| 1,673,795 | Beck | June 19, 1928 |
| 2,028,700 | Guier | Jan. 21, 1936 |
| 2,159,137 | Doty | May 23, 1939 |